3,218,331
PREPARATION OF SUBSTITUTED OXADIAZOLES
Fernand Eloy, Brussels, Belgium, assignor to Union
Carbide Corporation, a corporation of New York
No Drawing. Filed Apr. 17, 1962, Ser. No. 188,244
3 Claims. (Cl. 260—307)

This invention relates to the preparation of oxadiazoles. More particularly, this invention relates to the preparation of 3,5-disubstituted-1,2,4-oxadiazoles.

3,5-disubstituted-1,2,4-oxadiazoles are useful as nematocides, insecticides, bactericides, fungicides, defoliants, and the like. Exceptionally well suited for use as nematocides are the halogenated 3,5-disubstituted-1,2,4-oxadiazoles such as, for example, 3-phenyl-5-trichloromethyl-1,2,4-oxadiazole and 3-methyl - 5 - trichloromethyl-1,2,4-oxadiazole. In addition, 3-trichloromethyl-5-phenyl-1,2,4-oxadiazole is extremely toxic both to mite eggs and adult mites. Similarly, 3-trichloromethyl-5-methyl-1,2,4-oxadiazole possesses significant systemic and soil fungicidal activity as well as specific systemic insecticidal activity. Bactericidal properties are displayed by 3-phenyl-5-(5'-nitrofuryl) - 1,2,4 - oxadiazole and 3,5 - di(5'-nitrofuryl)-1,2,4-oxadiazole.

Furthermore, 3,5-disubstituted-1,2,4 - oxadiazoles having a trihalomethyl substituent in the 5-position of the oxadiazole nucleus may be utilized as intermediates for the synthesis of pharmaceuticals, high polymers, and also water-insoluble dyes, since these substituents can be easily converted into hydroxyl, amino, hydrazino, and similar groups thus leading to oxadiazole derivatives having specific applicability.

These compounds are preparable by a two-step process involving the acylation of an amidoxime followed by cyclization, usually carried out at elevated temperatures. In addition to the obvious drawbacks of a two-step process such prior process meets with difficulties in the preparation of amidoxime starting material (usually accomplished by reacting a nitrile with hydroxylamine). Furthermore, the cyclization does not always proceed readily, and in some instances the synthesis terminates at the acylamidoxime stage. Also, in some instances cyclization is achieved only at temperatures where the starting materials decompose.

It is an object of this invention to provide a novel process for the preparation of 3,5-disubstituted-1,2,4-oxadiazoles.

It is another object to provide a process for synthesizing 3,5-disubstituted-1,2,4-oxadiazoles at relatively low process temperatures.

It is a further object to provide a process for synthesizing 3,5-disubstituted-1,2,4-oxadiazoles wherein the desired oxadiazole is readily separated from the reaction products.

These and other objects are achieved by the process of the present invention which comprises contacting a substituted hydroxamyl halide with an imido-ester for a sufficient period of time to produce a 3,5-disubstituted-1,2,4-oxadiazole, the substituent of the hydroxamyl halide being bonded to the hydroxamyl halide radical through a carbon atom of the substituent.

Schematically, the synthesis of the present invention proceeds as follows:

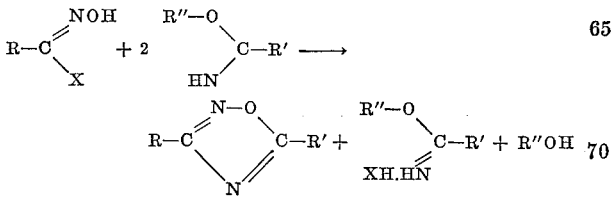

The specific substituents for the reactants will be discussed more fully hereinbelow. Theoretically, the hydroxamyl halide molecule reacts with one molecule of the imido-ester forming the oxadiazole, an alcohol, and hydrogen halide. The formed hydrogen halide reacts with another molecule of the imido-ester which is acting as a hydrogen halide acceptor and forms a hydrohalide which precipitates during the process. The hydrohalide may be converted to an imido-ester, if desired, by an alkaline treatment of the hydrohalide followed by distillation or crystallization. Also non-acylable organic bases, i.e., pyridine, dimethyl aniline trimethylamine, can be used for this purpose.

The hydroxamyl halide is characterized by the general formula:

(I) 

wherein R can represent alkyl, aryl, alkaryl, araykyl, cycloalkyl, alkoxycarbonyl, heterocyclic having from 5 to 6 atoms in the heterocyclic nucleus, haloalkyl, haloaryl, haloalkaryl, haloaralkyl, halocycloalkyl, alkoxyalkyl, alkoxyaryl, aryloxyalkyl, aryloxyaryl, the units

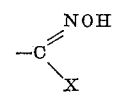

and

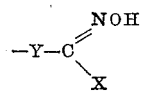

wherein X represents a halogen and Y represents a divalent saturated hydrocarbon having up to 18 carbon atoms, and the like.

By heterocyclic substituents, are meant heterocyclic radicals containing from 5 to 6 atoms in the nucleus and containing from 1 to 3 hetero atoms in said nucleus such as nitrogen, oxygen, and the like. In addition, the heterocycle can contain up to 10 atoms as a substituted moiety.

Illustrative R radicals in Formula I, above, include among others, methyl, ethyl, ethenyl, n-propyl, isopropenyl, iso-propyl, n-butyl, butenyl, iso-butenyl, butadienyls, sec-butyl, t-butyl, the amyls, the hexyls, the heptyls, the octyls, the dodecyls, the octadecyls, phenyl, phenylpropyl, phenylbutyl, cyclopentyl, 2-propylcyclohexyl, cyclohexyl, 2-methylcyclohexyl, cycloheptyl, methoxycarbonyl, ethoxycarbonyl, furyl, furfuryl, chloromethyl, chloroethyl, bromopropyl, bromobutyl, methoxymethyl, ethoxyethyl, propoxymethyl, butoxypropyl, and the like.

Representative classes of compounds within the above characterization include aliphatic-substituted hydroxamyl halides, haloaliphatic-substituted hydroxamyl halides, alicyclic-substituted hydroxamyl halides, haloalicyclic-substituted hydroxamyl halides, aromatic-substituted hydroxamyl halides, haloaromatic-substituted hydroxamyl halides, alkoxy-carbonyl-substituted hydroxamyl halides, heterocyclic-substituted hydroxamyl halides and the like.

Typical reactants, among others, can be methyl glyoxalate chloroxime, ethylglyoxalate chloroxime, propyl glyoxalate chloroxime, benzhydroxamyl chloride, o-chlorobenzhydroxamyl chloride, p-methylbenzhydroxamyl chloride, p-methoxybenzhydroxamyl chloride, o-, m-, and p-nitrobenzhydroxamyl bromide, o-, m-, and p-nitrobenzhydroxamyl acid chloride, p-carboxybenzhydroxamyl chloride, p-carboxybenzhydroxamyl bromide, p-cyanobenzhydroxamyl bromide, p-cyanobenzhydroxamyl chloride, cinnamohydroxamyl chloride, terephthalodihydroxyamyl chloride, furohydroxamyl chloride, 5-nitrofurohydroxamyl chloride, and the like.

The imido-ester reactants are characterized by the general formula:

(II)
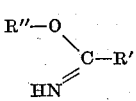

wherein R' can represent a radical enumerated above as suitable substituents for Formula I except for the units

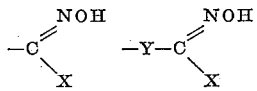

in lieu of which the units

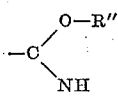

and

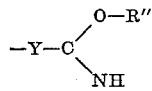

can be used. R" represents lower alkyls having from 1 to 4 carbon atoms.

Illustrative classes of compounds within the characterization of Formula II are aliphatic imido-esters which include the cycloaliphatic imido-esters, aromatic imido-esters, halogenated aliphatic imido-esters, halogenated aromatic imido-esters, heterocyclic imido-esters, and the like.

Representative of the imido-esters are methyl imidobenzoate, ethyl imidochlorobenzoate, n-propyl imidochlorobenzoate, iso-propyl imidochlorobenzoate, n-butyl imidochlorobenzoate, methyl nitrobenzoate, ethyl nitrobenzoate, methyl imidotoluate, ethyl imidotoluate, methyl imidonitrofuroate, ethyl imidofuroate, propyl imidofuroate, and the like.

The process of this invention can be conducted over a wide temperature range. Depending upon various factors such as the nature of the reactants, the amount of reactants employed, decomposition temperatures of the reactants and the end-product, the reaction temperature can be as low as 0° C., and lower, and as high as 100° C., and higher. A preferred temperature range is from about 0° C. to about 90° C.

In general, the reaction time will vary depending upon the operative temperature, the nature of reactants employed, the concentration of the reactants, the use of an inert, normally-liquid organic vehicle, and other factors. The reaction time can vary from several hours to several days, or more, depending on the variables illustrated above. A preferred reaction time is from about 2 to about 72 hours.

The substituted hydroxamyl halide and the imido-ester can be reacted in a wide range of proportions. Generally, molar ratios from about 10:1 to about 1:10 can be employed. A molar ratio of about 1:2 of hydroxamyl halide to imido ester is preferred since this facilitates the recovery of the desired end product.

The hydroxamyl halid and the imido-ester reactants are usually contacted in the presence of an inert, normally-liquid, organic vehicle such as, for example, aromatic solvents, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol, and the like; alcohols such as methanol, ethanol, the propanols and the like; normally liquid saturated hydrocarbons including the open chain, cyclic, and alkyl-substituted cyclic saturated hydrocarbons such as pentane, hexane, heptane, various normally-liquid petroleum hydrocarbon fractions, cyclohexane, the alkylcyclohexanes, decahydronaphthalene, and the like. The purpose of the vehicle is to facilitate contact between the reactants, thus, if the reactants are liquid at process temperature, the use of such vehicle becomes superfluous.

The present invention is further illustrated by the following examples:

Example I

To a reaction vessel were charged 15.5 grams of benzhydroxamyl chloride and 28.4 grams of ethyl imidobenzoate, both dissolved in anhydrous diethyl ether. The resulting mixture was then stored for 36 hours at a temperature of about 20° C. A precipitate of imidoester hydrochloride was formed upon standing. The reaction product mixture was first evaporated to dryness under reduced pressure and then water was added to the residue in order to dissolve the iminoether hydrochloride. The remaining insoluble material was identified as 3,5-diphenyl-1,2,4-oxadiazole (M.P. 109° C.). It was obtained in 90 percent yield.

Example II

To a reaction vessel were charged 5.7 grams of ethyl iminobenzoate dissolved in anhydrous diethyl ether and mixed with a diethyl ether solution containing 1.57 grams of dichloroglyoxime. This mixture was left standing for 48 hours at about 20° C. during which time a precipitate of imidoester hydrochloride was formed. The mixture was evaporated to dryness under reduced pressure and then water was added to the solid residue to dissolve the imidoester hydrochloride. The remaining insoluble material was identified as diphenyl-5,5'-bi(1,2,4-oxadiazole). (Yield: 80%; M.P. 242° C.) Recrystallization in acetic acid lead to colorless crystals.

Analysis (calculated for $C_{14}H_{10}O_2N_4$):

|  | C | H | N |
|---|---|---|---|
| Calculated (in percent) | 66.20 | 3.45 | 19.30 |
| Found (in percent) | 65.99 | 3.63 | 18.59 |

Example III

A. Nitrofurfural oxime (4.5 grams) was dissolved in anhydrous chloroform and cooled down to 0° C. while digesting 2.5 grams of chlorine for about 10 minutes. The resulting reaction product mixture was then brought to dryness under reduced pressure. The yellow residue so obtained in about 56 percent yield was identified as 5-nitrofurohydroxamyl chloride (M.P. 150° C. with decomposition). This compound was very soluble in alcohols, ether, chloroform, ethyl acetate, slightly soluble in cooled $CH_2Cl_2$ and insoluble in $CCl_4$ and petroleum ether.

Analysis (calculated for $C_5H_3O_4N_2Cl$):

|  | N | O |
|---|---|---|
| Calculated (in percent) | 14.69 | 33.60 |
| Found (in percent) | 14.66 | 33.57 |

B. 6.5 grams of 5-nitrofurohydroxamyl chloride prepared as in part A was then dissolved in diethyl ether and mixed with a diethyl ether solution of 10 grams of ethyl imidobenzoate and left standing for 36 hours at about 20° C. The resulting reaction product was then evaporated to dryness under reduced pressure and treated with water to dissolve the imidoester hydrochloride formed during the reaction. The insoluble residue was identified as 3-(5'-nitrofuryl)-5-phenyl-1,2,4-oxadiazole (M.P. 190° C.), obtained as yellow crystals in 80 percent yield.

Analysis (calculated for $C_{11}H_7O_4N_3$):

|  | C | H | N |
|---|---|---|---|
| Calculated (in percent) | 56.03 | 2.72 | 16.34 |
| Found (in percent) | 55.72 | 2.59 | 16.29 |

Example IV

A. To 13.8 grams of 2-cyano-5-nitrofurane, dissolved in 100 cc. of methanol, was added 0.23 gram of sodium dissolved in 25 cc. of methanol. This mixture was left standing for 72 hours at about 20° C. A current of dry $CO_2$ was then passed through the reaction mixture for about 1 hour. The resulting reaction product was then brought to dryness under reduced pressure and treated with anhydrous diethyl ether. A residue of insoluble $NaHCO_3$ was filtered off. The ethereal portion was then evaporated to dryness and gave the methyl iminonitrofuroate in 88 percent yield.

Analysis (calculated for $C_6H_6O_4N_2$):

|  | C | H | O |
| --- | --- | --- | --- |
| Calculated (in percent) | 42.28 | 3.52 | 37.60 |
| Found (in percent) | 42.35 | 3.42 | 37.63 |

B. A mixture comprising 13 grams of methyl imidonitrofuroate prepared as in part A and 7.2 grams of 5-nitrofurohydroxamyl chloride was heated to 80–90° C. on a steam-bath. The reaction occurred slowly. When the reaction was complete, the resulting reaction product was treated with water. The water-insoluble residue so obtained was recrystallized in acetic acid and gave yellow crystals (M.P. 171° C.) identified as 3,5-dinitrofuryl-1,2,4-oxadiazole in 84 percent yield.

Analysis (calculated for $C_{10}H_4O_7N_4$):

|  | C | H | O |
| --- | --- | --- | --- |
| Calculated (in percent) | 41.10 | 1.37 | 38.40 |
| Found (in percent) | 40.94 | 1.42 | 38.46 |

Example V

A mixture comprising 13 grams of methyl imidonitrofuroate and 5.9 grams of benzhydroxamyl chloride was heated to 80–90° C. on a steam-bath. When the reaction was complete, the resulting reaction product was first cooled down and then treated with water; the obtained residue was recrystallized in acetic acid and gave yellow crystals which were identified as 3-phenyl-5-(5'-nitrofuryl)-1,2,4-oxadiazole (M.P.: 168° C.) in 47 percent yield.

Analysis (calculated for $C_{12}H_7O_4N_3$):

|  | C | H | O |
| --- | --- | --- | --- |
| Calculated | 56.03 | 2.72 | 24.90 |
| Found | 56.27 | 2.66 | 24.86 |

The foregoing discussion and the examples have been intended for illustrative purposes only and should not be construed as limiting. Other variations within the spirit and scope of the present invention will readily present themselves to one skilled in the art.

I claim:

1. The process which comprises contacting, at a temperature of from 0° C. to 100° C., benzhydroxamyl chloride with ethylimidobenzoate for a period of time sufficient to produce 3,5-diphenyl-1,2,4-oxadiazole.

2. The process which comprises contacting, at a temperature of from 0° C. to 100° C., dichloroglyoxime with ethylimidobenzoate for a period of time sufficient to produce diphenyl-5,5'-bis(1,2,4-oxadiazole).

3. The process which comprises contacting, at a temperature of from 0° C. to 100° C., 5-nitrofurohydroxamyl chloride with ethylimidobenzoate for a period of time sufficient to produce 3-(5'-nitrofuryl)-5-phenyl-1,2,4-oxadiazole.

No references cited.

NICHOLAS S. RIZZO, *Primary Examiner.*